United States Patent [19]
Hurd

[11] Patent Number: 5,923,745
[45] Date of Patent: Jul. 13, 1999

[54] ROUTING CALLS TO CALL CENTERS

[75] Inventor: Michael D. Hurd, Flower Mound, Tex.

[73] Assignee: Teknekron Infoswitch Corporation, Fort Worth, Tex.

[21] Appl. No.: 08/808,625

[22] Filed: Feb. 28, 1997

[51] Int. Cl.[6] .................................................. H04M 7/00
[52] U.S. Cl. .................... 379/220; 379/265; 379/309; 379/207
[58] Field of Search .................... 379/201, 207, 379/219, 220, 221, 265, 266, 309

[56] References Cited

U.S. PATENT DOCUMENTS

| | | | |
|---|---|---|---|
| 4,696,028 | 9/1987 | Morganstein et al. | 379/88 |
| 4,747,124 | 5/1988 | Ladd | 379/67 |
| 4,783,796 | 11/1988 | Ladd | 379/67 |
| 4,809,321 | 2/1989 | Morganstein et al. | 379/211 |
| 4,922,519 | 5/1990 | Daudelin | 379/67 |
| 4,975,941 | 12/1990 | Morganstein et al. | 379/88 |
| 5,020,095 | 5/1991 | Morganstein et al. | 379/67 |
| 5,027,384 | 6/1991 | Morganstein | 379/67 |
| 5,029,196 | 7/1991 | Morganstein | 379/67 |
| 5,109,405 | 4/1992 | Morganstein | 379/89 |
| 5,166,974 | 11/1992 | Morganstein et al. | 379/67 |
| 5,303,298 | 4/1994 | Morganstein et al. | 379/67 |
| 5,309,504 | 5/1994 | Morganstein | 379/67 |
| 5,325,422 | 6/1994 | Ladd | 379/67 |
| 5,347,574 | 9/1994 | Morganstein | 379/210 |
| 5,384,841 | 1/1995 | Adams et al. | 379/266 |
| 5,444,774 | 8/1995 | Friedes | 379/266 |
| 5,452,350 | 9/1995 | Reynolds et al. | 379/220 |
| 5,479,487 | 12/1995 | Hammond | 379/67 |
| 5,509,064 | 4/1996 | Weiner et al. | 379/265 |
| 5,528,678 | 6/1996 | Kaplan | 379/201 |
| 5,530,744 | 6/1996 | Charalambous et al. | 379/265 |
| 5,546,452 | 8/1996 | Andrews et al. | 379/219 |
| 5,555,299 | 9/1996 | Maloney et al. | 379/212 |
| 5,568,544 | 10/1996 | Keeler et al. | 379/273 |
| 5,633,924 | 5/1997 | Kaish et al. | 379/266 |
| 5,729,600 | 3/1998 | Blaha et al. | 379/265 |
| 5,740,238 | 4/1998 | Flockhart et al. | 379/221 |
| 5,740,240 | 4/1998 | Jolissaint | 379/265 |
| 5,754,639 | 5/1998 | Flockhart et al. | 379/221 |
| 5,787,160 | 7/1998 | Chaney et al. | 379/220 |
| 5,787,163 | 7/1998 | Taylor et al. | 379/265 |

OTHER PUBLICATIONS

"Intelligent CallRouter™," Brochure, GeoTel Comunications Corporation, date unknown, 4 pages.

*Primary Examiner*—Daniel S. Hunter
*Attorney, Agent, or Firm*—Baker & Botts, L.L.P.

[57] ABSTRACT

A system is provided for routing calls. The system includes a plurality of call centers coupled to a public switched telephone network which supports a caller identification feature and a transfer feature. A trunk interface, coupled via a link to the public switched telephone network, receives a call from the public switched telephone network over the link. A database stores customer profile information and call center information. A processor is coupled to the trunk interface and the database. The processor identifies a customer placing the call utilizing the caller identification feature, retrieves from the database customer profile information associated with the identified customer, and selects one of the call centers in response to the customer profile information and the call center information. The processor routes the call to the selected call center, after which the link is released utilizing the transfer feature.

27 Claims, 4 Drawing Sheets

ROUTING CALLS TO CALL CENTERS

TECHNICAL FIELD OF THE INVENTION

This invention relates generally to the field of telecommunications, and more particularly, to routing calls to call centers.

BACKGROUND OF THE INVENTION

In the modern world, goods or services may be offered through or supported by a telecommunications-based network of call centers which can receive calls from various customers. Each call center may comprise a combination of human and machine resources which are intended to serve and be responsive to the needs or desires of the customers. The human resources may include a plurality of customer service representatives. Typically, these customer service representatives have varying levels of ability with regard to expertise on particular products and/or services, interpersonal skills, company policies, or any of a number of other things. An important objective of a call center network is to provide each customer who calls in with the highest quality of service within the shortest amount of time by the most qualified customer service representative available who has at his or her disposal the appropriate information for a particular customer call.

Previously, in a network comprising a plurality of call centers, an incoming call could be received initially at any one of the call centers. Because this receiving call center was not always the one most suitable for handling the call (e.g., the customer service representatives at the receiving call center lacked sufficient knowledge of a particular line of products), such a call would need to be transferred to another call center for handling in many cases. A transfer between call centers, however, tied up valuable resources in the call center network. At a minimum, the transfer required an incoming line supporting the call into the receiving call center, an outgoing line from the receiving call center, and an incoming line into the call center to which the call was transferred. All of these lines would be utilized, and thus unavailable for other calls, until the transferred call was completed. Furthermore, if the call needed to be transferred to yet another call center or back to the receiving call center, additional lines would be utilized. Consequently, in order to provide quality service to customers, a sufficient number of lines were required to support the receipt of incoming calls and transfer of these calls between call centers.

Systems have previously been developed to route calls to different call centers within a call center network. In such systems, a call coming into the network would be routed to the call center with the shortest wait time for the incoming call. This typically corresponded to the call center with the greatest number of available customer service representatives. However, the call center with the shortest wait time was not necessarily the most appropriate call center for handling the incoming call. Consequently, in these prior systems, calls would still need to be transferred between call centers.

SUMMARY OF THE INVENTION

In accordance with the present invention, the disadvantages and problems associated with prior systems and techniques for routing calls in a call center network have been substantially reduced or eliminated.

According to an embodiment of the present invention, a system is provided for routing calls. The system includes a plurality of call centers coupled to a public switched telephone network which supports a caller identification feature and a transfer feature. A trunk interface, coupled via a link to the public switched telephone network, receives a call from the public switched telephone network over the link. A database stores customer profile information and call center information. A processor is coupled to the trunk interface and the database. The processor identifies a customer placing the call utilizing the caller identification feature, retrieves from the database customer profile information associated with the identified customer, and selects one of the call centers in response to the customer profile information and the call center information. The processor routes the call to the selected call center, after which the link is released utilizing the transfer feature.

According to another embodiment of the present invention, a method is provided for routing calls to one of a plurality of call centers. In the method, call center information is stored in a database. A call from a public switched telephone network is received over a link. The public switched telephone network supports a caller identification feature and a transfer feature. A customer placing the call is identified utilizing the caller identification feature. Customer profile information associated with the identified customer is retrieved. One of the call centers is selected in response to the customer profile information and the call center information. The call is routed to the selected call center, after which the link is released utilizing the transfer feature.

Important technical advantages of the present invention include a network routing unit (NRU) which intelligently routes calls to suitable call centers within a call center network. Preferably, the network routing unit is coupled to a public switched telephone network (PSTN) which supports a caller identification feature (e.g., automatic number identification (ANI), dialed number identification service (DNIS), or direct inward dialing (DID)) and a transfer feature (e.g., external switch hook and transfer feature). The network routing unit serves as a "front end" to receive all calls coming into the call center network. For a particular call, the network routing unit may establish the identity of the customer placing the call using the caller identification feature. The network routing unit may also query the customer for other information. The network routing unit determines and selects the most suitable call center for the call based upon the identity of the customer and any other information collected from the customer. The call is routed to the selected call center for handling, after which the line utilized for receiving the call is released using the transfer feature. Accordingly, the present invention reduces the number of lines required to provide quality service in a call center network.

Another technical advantage of the present invention includes a network routing unit that is preferably coupled to an ISDN-supported line in which some time is provided before a call must be "rung" at a particular termination point. The network routing unit may use up this time to perform processing for intelligently routing the call to an appropriate call center. Furthermore, because such a relatively lengthy period of time is available, if the most suitable call center is busy, routing of a call can be delayed in many cases until such call center is available. Accordingly, the call can be routed to the "best" call center rather than one which is merely convenient or available.

Yet another important technical advantage of the present invention includes inserting information into the call record of the customer call before routing the call to an appropriate call center. This inserted information may include customerentered information and data information, such as customer profile information. When the routed call is received at the appropriate call center, the inserted information is readily processed and coordinated with a voice component of the call.

Other important technical advantages are readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals used for like and corresponding parts of the various drawings.

Figure 1:
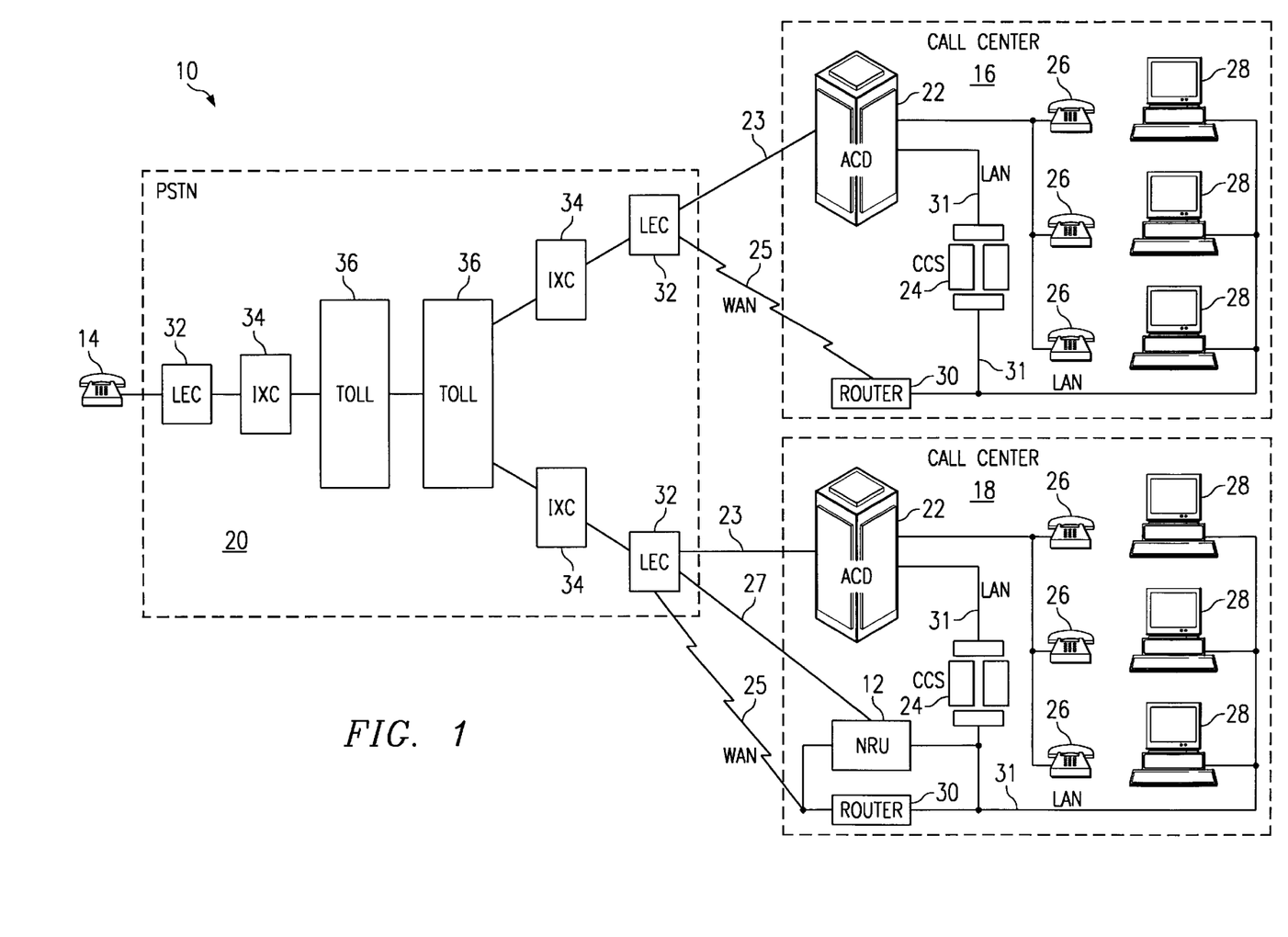
FIG. 1 illustrates a block diagram of an exemplary call center network incorporating a network routing unit, according to the present invention.

FIG. 1 is a block diagram of a network 10 which incorporates a network routing unit (NRU) 12, according to an embodiment of the present invention. Within network 10, a call made by an existing or potential customer (hereinafter referred to as a "customer") at a voice instrument 14 is routed or delivered to one of a plurality of call centers 16, 18 via a public switched telephone network (PSTN) 20 using network routing unit 12.

The call can be any suitable call or session supporting communication of voice, data, a combination of voice and data, in-band or out-of-band signalling, or any other kind of information. The call has an associated call message which comprises control information. Generally, network routing unit 12 receives the call message and, prior to answering, performs processing, and then answers the call and/or routes the call to any suitable termination point at which the call can be handled. Such termination point can be a call center 16, 18, an extension of a customer service representative, a combination of a call center and extension, or any other switchable termination point for handling a call. Accordingly, it should be understood that hereinafter any reference of routing to a call center shall mean routing to any suitable termination point.

Voice instrument 14 can be a wired office or residence telephone or, alternatively, a cellular telephone in communication with a personal communications system (PCS) that is coupled to public switched telephone network 20. Voice instrument 14 may have an associated number which can be identified by an automatic number identification (ANI) feature offered and/or supported by various call protocols, methods, techniques, and the like.

Call centers 16, 18 can be maintained and operated by a supplier or vendor of goods and/or services (hereinafter referred to as a "provider"). For example, a provider can be a mail-order catalogue company. Call centers 16, 18 provide or support various services relating to the operations of the provider, such as, for example, the placement of orders in response to customer calls. Each of call centers 16, 18 comprise a private branch exchange (PBX) or automatic call distributor (ACD) 22, a contact control server (CCS) 24, a plurality of customer service representative (CSR) voice instruments 26 and corresponding work stations 28, and a router 30.

Within a particular call center 16 or 18, automatic call distributor 22 serves as a call distribution circuit to route or distribute calls received over a link 23 from public switched telephone network 20 to any of CSR voice instruments 26, which may comprise telephones, headsets, or any other suitable components. Contact control server 24 may comprise or be coupled to a suitable database (not explicitly shown) which contains information for the management and operation of the call center 16, 18 within which it is located. This information may include call center dynamics information which, at any moment, specifies the amount of call traffic received at the call center, the number of calls awaiting handling (i.e., the number of customers "on hold"), the number and identity of the customer service representatives who are available or unavailable, and the like. Contact control server 24 is linked to automatic call distributor 22 and work stations 28, which can be used by a customer service representative in conjunction with a corresponding voice instrument 26 to provide service to a customer. Each work station 28 can receive information from contact control server 24, and is operable to display received or generated information to the customer service representative. Contact control server 24 runs appropriate software to coordinate the simultaneous arrival and transfer of voice and data at CSR voice instruments 26 and corresponding work stations 28. In one embodiment, automatic call distributor 22, contact control server 24, work stations 28, and router 30 may be coupled via a suitable local area network (LAN) 31. Router 30 can be implemented as a computer-telephone integration (CTI) device. Router 30 functions to receive and transmit data information to and from call center 16, 18 within which it is located. Each router 30 may be coupled to public switched telephone network 20 via a suitable wide area network (WAN) link 25.

Public switched telephone network 20 generally comprises any combination of wirelines, optical fiber, switches, radio and microwave transceivers, satellites, stations, control devices, computing platforms, and the like, which cooperate to deliver calls between and among customer voice instrument 14 and call centers 16 and 18. Communication within public switched telephone network 20 can be supported by or utilize various techniques, protocols, call models, etc., including, but not limited to, time division multiple access (TDMA), code division multiple access (CDMA), asynchronous transfer mode (ATM), analog, Integrated Services Digital Network (ISDN), Advanced Intelligent Network (AIN), and the like.

As shown, public switched telephone network 20 includes one or more of the following elements: a local exchange carrier (LEC) 32, an interexchange carrier (IXC) 34, and a toll switch 36. Local exchange carriers 32 provide service on a local level and may support analog or digital communication, such as integrated services digital network (ISDN) protocols, including basic rate interface (BRI) or primary rate interface (PRI). As shown, each of customer voice instrument 14 and call centers 16 and 18 are coupled to a local exchange carrier 32. Each interexchange carrier 34 is coupled to one or more local exchange carriers 32, and communicates using any appropriate digital trunk technology, such as T1 or ISDN PRI protocol. Each toll switch 36 is coupled between one or more interexchange carriers 34 and other toll switches 36. Toll switches 36 and interexchange carriers 34 communicate using any suitable protocols such as T1, ISDN, or signalling system number 7. Toll switches 36 can be coupled together via suitable link, such as a synchronous optical network (SONET).

The present invention contemplates that local exchange carriers 32, interexchange carriers 34, toll switches 36, and other elements of public switched telephone network 20 support various features. Under a transfer feature, a call from an origination point is directed to a first termination point over a corresponding link. From the first termination point, the call can be routed or transferred to a second termination point at any time, including before or after the call has been answered. When the call is transferred, the link to the first termination point is released and communication between the origination point and the second termination point occurs over a link for the second termination point. In one embodiment, this transfer feature may comprise an external switch hook transfer feature, a "TAKE-BACK AND TRANSFER" feature offered by AT&T, and/or like features provided by other IXC or LEC service providers. Other features supported by public switched telephone network 20 may include automatic number identification (ANI), dialed number identification service (DNIS), and direct inward dialing (DID).

Network routing unit 12 can be physically located at a call center 18 of network 10, as illustrated in FIG. 1. Network routing unit 12 may be coupled to and receive data information from the contact control server 24 of this local call center 18 via the LAN connection 31 of the call center 18. Furthermore, network routing unit 12 may be coupled to public switched telephone network 20 via the same WAN link 25 supporting call center 18. Network routing unit 12 may receive data information over WAN link 25 from any call center 16 that is remote from the call center 18 at which unit 12 is located. The information received by network routing unit 12 over LAN connection 31 and WAN link 25 may include call center dynamics information for each call center 16, 18 in network 10.

With respect to voice and control information for calls, however, network routing unit 12 communicates with and receives calls from public switched telephone network 20 over a link 27 that is separate from link 23 over which automatic call distributor 22 of call center 18 receives calls. As shown, link 27 connects network routing unit 12 to a local exchange carrier 32 of public switched telephone network 20. Link 27 comprises one or more analog or digital links suitable for handling incoming call traffic at call centers 16, 18. Network routing unit 12 may have at least one associated telephone number, such as a "1-800" number, supported by link 27.

Network routing unit 12 receives calls directed to the associated telephone number over link 27. For each of these calls, network routing unit 12 can extract pertinent information from the call message, identify the caller from ANI/DNIS/DID information, answer the call if necessary to collect additional information from a caller, determine the most suitable call center and customer service representatives for the call, route the call to one of call centers 16, 18 for handling by a suitable customer service representative, transmit data information relating to the customer to the same call center 16, 18, and/or otherwise handle the call. After routing a call, network routing unit 12 may utilize the external switch hook transfer supported by public switched telephone network 20 to transfer the call in order to release or free up a line of link 27.

To accomplish the functions described herein, network routing unit may comprise a combination of hardware and/or software components, including appropriate interface cards, voice announcement equipment, voice recognition equipment, dual tone multi-frequency (DTMF) interpreter or other in-band or out-of-band signalling facilities, processing facility, database, and the like. An exemplary embodiment of network routing unit 12 is illustrated and described below in more detail with reference to FIG. 3.

Generally, in operation, network routing unit 12 functions as a "front end" to network 10. That is, all or a significant portion of customers use the telephone number or numbers associated with network routing unit 12 to contact the provider operating or maintaining network 10. Network routing unit 12 may receive call center dynamics information from local call center 18 over LAN connection 31 and from each remote call center 16 over WAN link 25, such information being collected by the contact control server 24 in each call center 16, 18.

For a particular call, network routing unit 12 may receive an analog or digital in-band or out-of-band call message from a customer using a voice instrument 14. The connection for the call is established over link 27 with public switched telephone network 20. From the call message, network routing unit 12 extracts certain information, such as ANI/DNIS/DID information. The extracted information can be processed before the call is answered in order to determine the identity of the calling customer. Network routing unit 12 can determine the most suitable call center 16, 18 and/or customer service representative for handling the call. In some cases, network routing unit 12 answers the call to query and collect more information from the customer, after which network routing unit 12 either completes the call or routes the call to an appropriate call center 16, 18 and/or customer service representative for handling. In other cases, network routing unit 12 routes the call to a call center 16, 18 without answering.

After routing the call to a call center 16, 18, network routing unit 12 may utilize a transfer feature, which can be supported in both analog and digital (e.g., ISDN) services, to release the line of link 27 being used for the call. The transfer feature may comprise an external switch hook and transfer feature which enables the transfer of a call from a first termination point over a first line to a second termination point over a second line, after which the first line is released. The transfer feature establishes communication over a line of link 23 coupling the automatic call distributor 22 of the call center 16, 18 to public switched telephone network 20. It should be understood that in one embodiment, the transfer feature will extend back to the element of public switched telephone network 20 that is common to both the transferring and the transferred termination points. Thus, for a transfer to call center 18, the call is taken back and transferred at the local exchange carrier 32 to which both network response unit 12 and the automatic call distributor 22 of call center 18 are coupled. For a transfer to call center 16, the call is taken back and transferred at the toll switch 36 common to network response unit 12 and the automatic call distributor 22 of call center 16. In this manner, a line of link 27 between network routing 12 unit and public switched telephone network 20 is released, and thus available, once the call has been routed to a call center 16, 18. In addition, other information relating to the customer can be sent from network routing unit 12 to the same call center 16, 18 via WAN link 25 or LAN connection 31.

In a particular embodiment, an ISDN-supported line provides a time interval, such as four seconds, before a call must be "rung" at a particular termination point. In one embodiment, network routing unit 12 may use up to the entire time interval to perform processing for intelligently routing the call to an appropriate call center 16, 18. Furthermore, because such a relatively large amount of time is available, if the most suitable call center is busy, routing of a call can be delayed in some cases until such call center is available. Accordingly, the call can be routed to the "best" call center rather than one which is merely convenient or available. For example, during the first three seconds of a call, it may be determined that all lines at the most suitable call center are unavailable, and thus, the call cannot be routed to that call center without the customer obtaining a busy signal or being placed on hold. However, in the fourth second of the call, a line may become available at the desired call center, and the call routed to the same prior to the moment when the call must be rung. Thus, the time interval can be used as a predetermined delay period.

Figure 2:
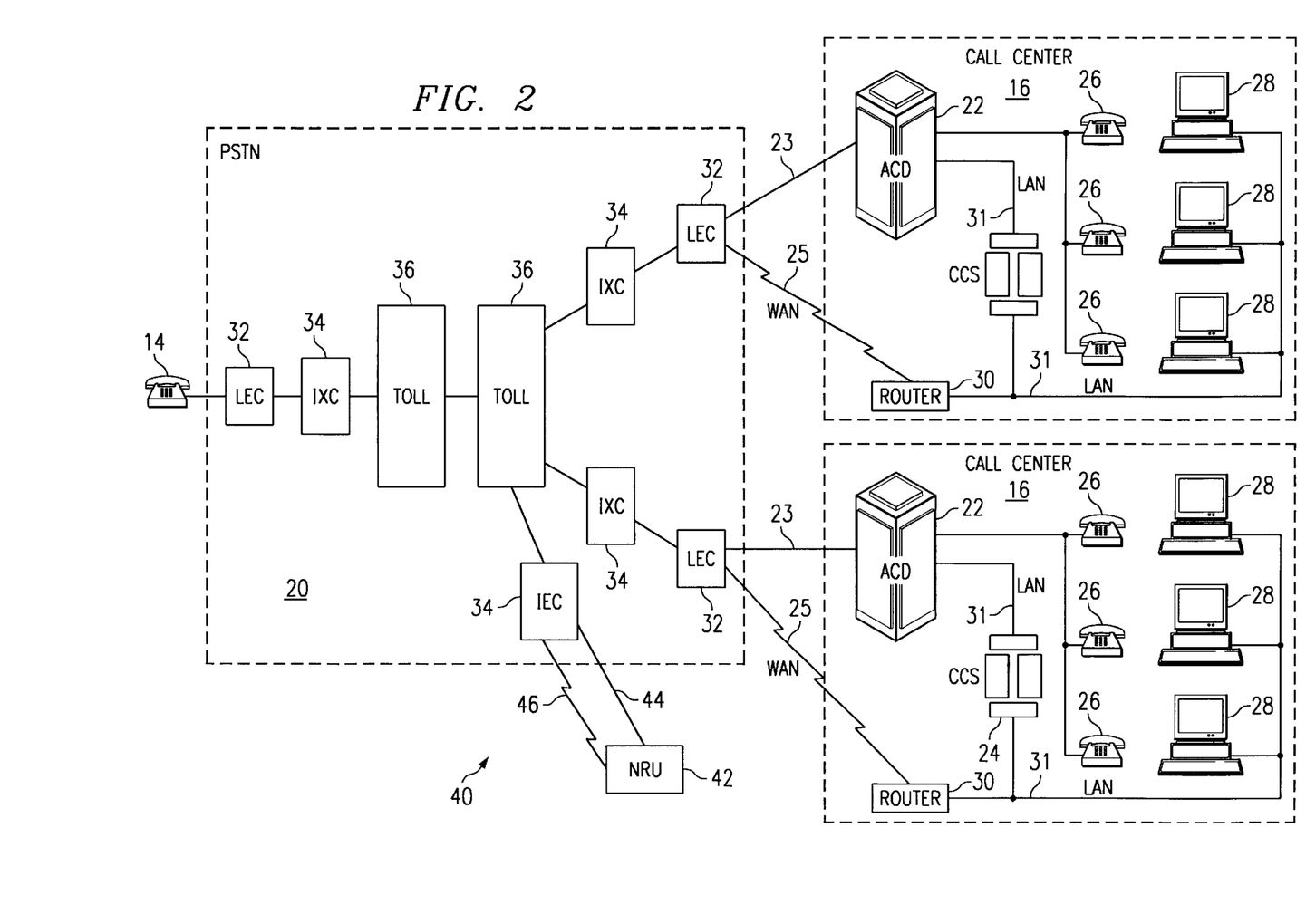
FIG. 2 illustrates a block diagram of another exemplary call center network incorporating a network routing unit, according to the present invention.

FIG. 2 illustrates another call center network 40 which incorporates a network routing (NRU) unit 42, according to an embodiment of the present invention. Like network 10 shown in FIG. 1, call center network 40 comprises a plurality of call centers 16 operable to communicate with a customer voice instrument 14 via a public switched telephone network 20.

Each call center 16 comprises an automatic call distributor (ACD) 22, a contact control server (CCS) 24, a plurality of customer service representative (CSR) voice instruments 26 and corresponding work stations 28, and a router 30. These elements function and cooperate in substantially the same manner as described above with reference to FIG. 1 to support various services to one or more customers. Public switched telephone network 20 includes one or more components of a local exchange carrier (LEC) 32, an interexchange carrier (IXC) 34, and a toll switch 36, these elements functioning and cooperating in the same manner as described above with reference to FIG. 1.

Network routing unit 42 is coupled to public switched telephone network 20 via a link 44 for communicating voice and control information for calls and a WAN link 46 for communicating data information. Network routing unit 42 functions primarily in the same manner as described above for network routing unit 42.

Call center network 40 differs from network 10 in several respects. Unlike network routing unit 12 of network 10 which is located at call center 18, network routing unit 42 of call center network 40 is physically separate from any call centers 16. Accordingly, a separate WAN link 46 is provided for network routing unit 42. Also, network routing unit 42 is coupled to an interexchange carrier 34 of public switched telephone network 20, rather than a local exchange carrier 32 like network routing unit 12. It is contemplated that, in other embodiments, a network routing unit can be coupled to any other suitable element of public switched telephone network 20, including a toll switch 36. That is, network routing unit 12 can be coupled to any point in network 10 from which a call can be intercepted and routed to an appropriate termination point or call center 16, 18.

Figure 3:
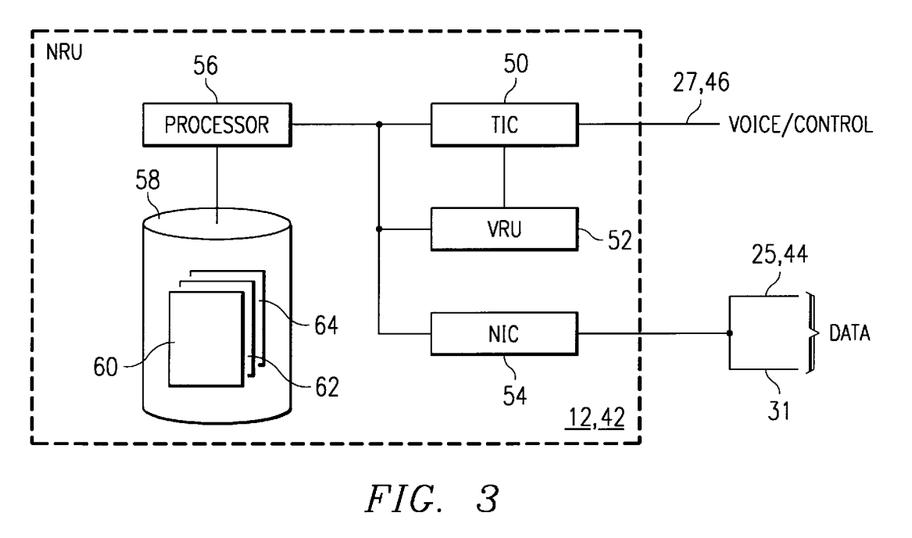
FIG. 3 illustrates a block diagram of an exemplary network routing unit, according to an embodiment of the present invention.

FIG. 3 illustrates a block diagram of an exemplary network routing unit 12 or 42, according to an embodiment of the present invention. For clarity, this embodiment will be described with reference to network routing unit 12 (unless otherwise indicated), although it should be understood that the same description is applicable to network routing unit 42. As shown, network routing unit 12 includes a trunk interface card (TIC) 50, a voice response unit (VRU) 52, a network interface card (NIC) 54, a processor 56, and a memory 58.

Trunk interface card 50 enables network routing unit 12 to communicate with a public switched telephone network 20 over link 27 (or link 46 for network routing unit 42) in order to receive and transmit voice, data, voice and data, as well as in-band or out-of-band signalling, control information, or messages for various calls. Trunk interface card 50 may comprise any one or a combination of commercially available cards such as, for example, those manufactured by DIALOGIC or DIANATEL. Trunk interface card 50 may support any suitable analog or digital protocols, such as T1, T3, E1, E3, or primary rate interface (PRI) of ISDN.

Trunk interface card 50 may be used to collect or extract information, such as a call message, from the control information associated with an incoming call. This may include information for automatic number identification (ANI), dialed number identification service (DNIS), direct inward dialing (DID), and other services supported by many existing protocols. Trunk interface card 50 may also be used to insert various information into the call record of a call. Such inserted information can include routing information which specifies the number of a particular call center 16, 18 and/or a number or extension of a suitable customer service representative in network 10. For example, in one embodiment, trunk interface card 50 may be used to modify DNIS digits in a call message. The inserted information may also comprise customer provided information. Furthermore, trunk interface card 50 may support the utilization of an external switch hook transfer feature that is available from the public switched telephone network 20.

Voice response unit 52 is coupled to trunk interface card 50. Voice response unit 52 may comprise a combination of hardware and/or software elements to support a number of functions such as, for example, voice announcements or queries, voice recognition, interpretation and generation of dual tone multi-frequency (DTMF) or other in-band or out-of-band signalling, and the like. Voice response unit 52 may cooperate with trunk interface card 50 to answer calls and collect information necessary to process calls. This information may include caller-entered digits and other customer information, which can specify a name or other identifier for a customer, such as a home or work telephone number.

Network interface card 54 is operable to communicate with public switched telephone network 20 over WAN link 25 (or WAN link 44 for network routing unit 42) to transmit and receive data information from remote call centers 16. Network interface card 54 is further operable to transmit and receive data information from a local call center 18 via LAN connection 31. The data information received by network interface card 54 may comprise call center dynamics information collected at the contact control servers 24 of call centers 16, 18. As stated above, call center dynamics information may specify an identification of the call center, the amount of call traffic received, the number of calls awaiting handling (i.e., the number of customers "on hold"), the number and identity of the customer service representatives who are available or unavailable, and any other information concerning the operation of automatic call distributor 22 and contact control server 24. Information which can be transmitted to call centers 16, 18 using network interface card 54 includes customer profile information 60 (described below).

Memory 58 may reside in a suitable storage medium, such as random access memory (RAM), disk, tape storage, or other suitable data storage system. Memory 58 can be a relational database. Memory 58 functions to receive, store, and forward various types of information which support the operation of network routing unit 12 as described herein. This information includes customer profile information 60, call center information 62, customer service representative information 64.

Generally, customer profile information 60 comprises any information relating to one or more customers or potential customers for the service or goods provided by call centers 16 and 18. For each customer, customer profile information 60 may specify, among other things a customer's name, home address, work address, home telephone number, work telephone number, credit card number, billing address, family members and other relatives, etc. Customer information that is received from a customer can be stored as part of customer profile information 60. In addition, for each customer, customer profile information 60 may contain information relating to or specifying the interests of the customer (e.g., particular products or services, or particular lines of products or services) and personal characteristics of the customer (e.g., amiable, quick-tempered, etc.).

Call center information 62 can be any information relating to one or more call centers within a call center network, such as network 10 or 40. Generally, for each call center, call center information 62 may specify an identification for the call center, one or more telephone numbers and associated extensions for the call centers, a location of the call center, the number of customer service representatives stationed at the call center, the identity of each of these operators and their current extensions, and the like. Call center information 62 may also comprise call center dynamics information, which may specify the amount of traffic being received or handled at the call center, the number of agents that are occupied, the number of agents which are available, the identity of agents which are occupied or available, the number of calls which are on hold or waiting to be processed, and the like.

Customer service representative profile information 64 generally includes information relating to the customer service representatives who handle or process calls at the various call centers 16, 18. For each customer service representative, customer service representative information 64 may specify a name, extension, or other identifier, the call center at which the representative is located, the times during which the representative is working, any special knowledge, skills, or abilities the representative may have, such as interpersonal skills, organizational skills, knowledge of company policy, knowledge of particular products or services, etc.

Processor 56 is coupled to each of trunk interface card 50, voice response unit 52, network interface card 54, and memory 58. Accordingly, processor 56 is operable to communicate information to and from trunk interface card 50, voice response unit 52, network interface card 54, and memory 58. This information may include voice or control information, customer information, call center dynamics information, customer profile information 60, call center information 62, customer service representative profile information 64, and any other suitable information supporting the operation and functions of network response unit 12.

Processor 56 functions to process all or a portion of the various information described above in order to determine one or more suitable termination points, such as call centers 16, 18 and/or customer service representatives to which a call could be routed. In one embodiment, these call centers and/or representatives can be ranked by order of preference, the highest ranking corresponding to the most suitable. Processor 56 is further operable to determine the availability of the suitable call centers 16, 18 and/or representatives. Processor 56 may select the customer service representative and call center deemed to be the most suitable and which happen to be available at the moment. Processor 56 may generate routing information which specifies the number or extension of the particular call center and/or representative which has been selected.

In one embodiment, the process of ranking call centers 16, 18 and/or customer service representatives may comprise ranking all of the call centers and/or representatives, and identifying a predetermined number of the most suitable call centers and/or representatives. The predetermined number can be configurable based on any of a variety of factors, such as total number of call centers and/or representatives in network 10, number of call centers and/or representatives operating or working at the time a call is received, number of call centers and/or representatives with appropriate expertise or knowledge, and the like. A call is preferably routed to a call center and/or representative having the highest ranking within the predetermined number. Furthermore, the routing of a call can be delayed if none of these identified call centers and/or representatives within the predetermined number are immediately available (as described below in more detail).

Processor 56 also functions to direct the transfer of a customer call back to public switched telephone network 20 for routing to a suitable call center 16, 18 where the call can be handled as necessary. After a call has been routed to a call center 16, 18, processor 56 may cooperate with trunk interface card 50 to release the line of link 27 (or 46) over which the call was received at network routing unit 12 (or 42).

Processor 56 can be implemented as a main-frame, file server, work station, and/or other suitable data processing facility running appropriate software. In one embodiment, processor 56 may comprise an INTEL processor operating under the control of a suitable operating system such as MS-DOS, MACINTOSH OS, WINDOWS NT, WINDOWS 95, OS/2, UNIX, XENIX, or the like.

It should be understood that network routing unit 12 may include multiples for each of trunk interface card 50, voice response unit 52, network interface card 54, processor 56, and memory 58, to provide the appropriate capacity and fault tolerant characteristics of network routing unit 12.

Figure 4:
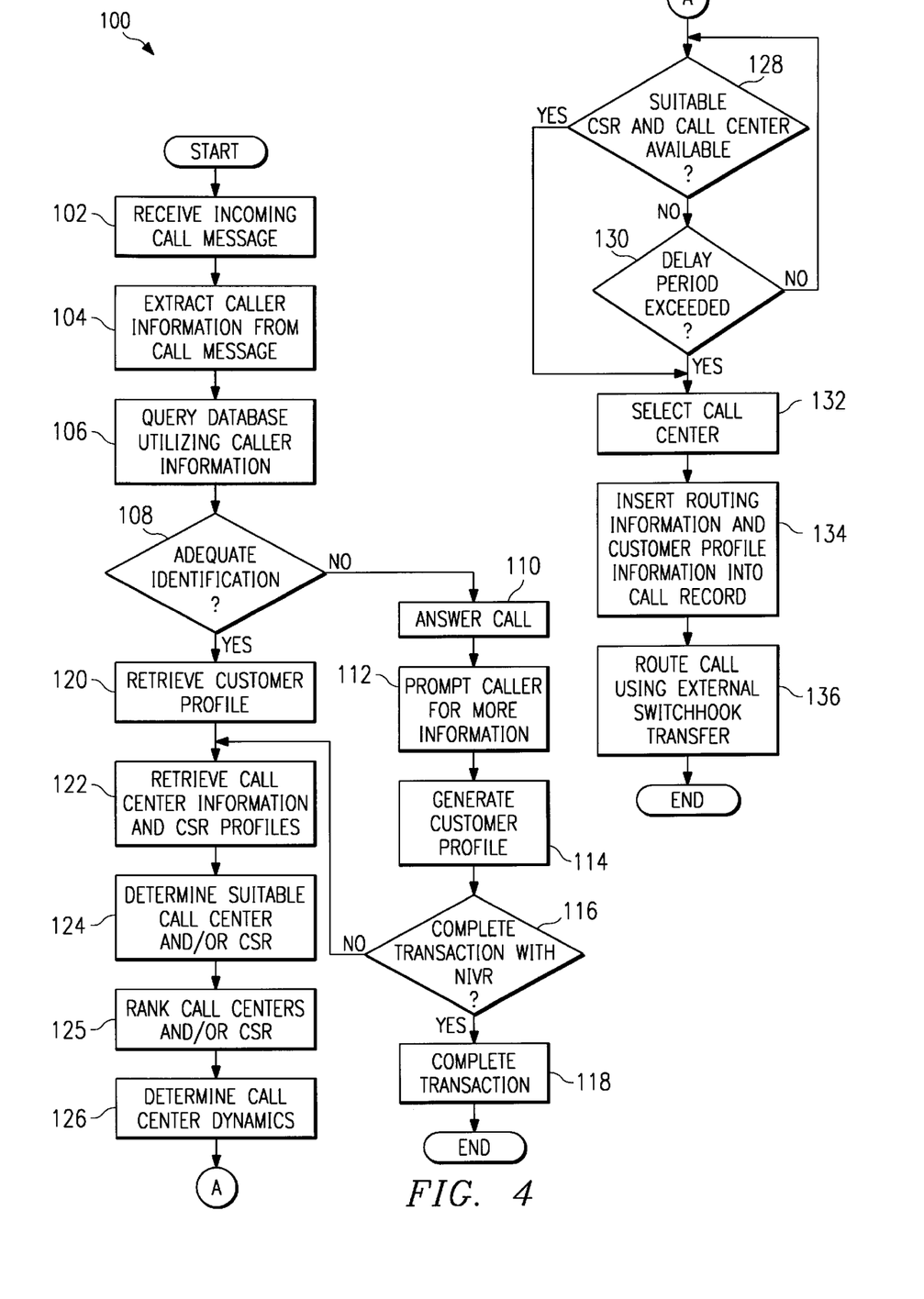
FIG. 4 is a flow chart of an exemplary method for routing a call, according to an embodiment of the present invention.

FIG. 4 is a flow chart of an exemplary method for routing a telephone call to one of a plurality of call centers, according to an embodiment of the present invention. In one embodiment, method 100 may correspond to the operation of network routing unit 12 (or 42).

Method 100 begins at step 102 where trunk interface card 50 receives a call message over a line of link 27 (or 46). The call message comprises control information for an incoming call. This control information may include in-band or out-of-band information, such as automatic number identification (ANI), dialed number identification service (DNIS), direct inward dialing (DID), and other services supported by many existing protocols, including ISDN basic rate interface (BRI) service. Trunk interface card 50 may cooperate with processor 56 to extract caller information from the received call message at step 104. The caller information may include ANI/DNIS/DID information, or any other information which can be used to identify a caller.

Processor 56 queries the database of memory 58 utilizing the extracted caller information at step 106. In one embodiment, the caller information is compared against caller profile information 60. This step is performed in order to determine whether the caller is a customer for which caller profile information 60 has been previously provided or collected from the customer.

Processor 56 determines whether the caller has been adequately identified as a customer at step 108. If the caller has not been adequately identified as a customer, then voice response unit 52 answers the call at step 110. At step 112, voice response unit 52 prompts the caller for more information, for example, using a set of pre-recorded messages. After each message, a caller may be prompted to enter a response or answer, for example, using a touch tone key pad, such as that commonly available on telephones, or with a voice response. With a dual tone multi-frequency (DTMF) interpreter and/or appropriate voice recognition hardware and software, voice response unit 52 collects the responses as customer information. The customer information is forwarded to processor 56. Processor 56 generates a suitable customer profile from the collected customer information at step 114. This customer profile is stored into memory 58 as part of customer profile information 60.

Processor 56 then determines at step 116 whether the transaction with the caller should be completed at network routing unit 12. If so, then the transaction is completed at step 118. Otherwise, if it is determined that the transaction should not be completed at the network routing unit 12, then method 100 moves to step 122.

Referring again to step 108, if it is determined that the caller has been adequately identified as a customer, then processor 56 retrieves a corresponding customer profile from memory 58 at step 120. This customer profile may specify the customer's full name, a home telephone number, a work telephone number, a home address, a work address, credit card number, billing address, family members, and the like for the customer. In addition, the customer profile may contain various information relating to or specifying purchasing history or the interests of the customer and the personal characteristics of the customer.

At step 122, processor 56 retrieves call center information 62 and one or more customer service representative profiles from customer service representative profile information 64. Call center information 62 may specify an identification for each call center, one or more telephone numbers and associated extensions for each call center, locations, number and expertise of customer service representatives at each call center, the current extensions for these representatives, and the like. Each customer service representative profile may specify the name or some other identifier of a representative, the call center at which the representative works, any special knowledge that the representative may have, interpersonal skills of the representative, and the like.

Using the retrieved customer profile, call center information, and customer service representative profiles, processor 56 then determines one or more call centers and/or customer service representatives which are suitable to handle the call at step 124. As shown, processor 56 ranks the call centers and/or customer service representatives at step 125. In this process of ranking, processor 56 may identify a predetermined number of the most suitable call centers and/or representatives for handling the call. Consequently, network routing unit 12 identifies those customer service representatives who are most appropriate to respond to the needs of the identified customer. At step 126, processor 56 determines the dynamics of the various call centers 16, 18 in network 10. This may be accomplished by processing call center dynamics information received by network interface card 54 at WAN link 25 (or 44) and LAN connection 31.

Processor 56 determines whether any of the call centers and/or customer service representatives which have been ranked as suitable are available at step 128. If no suitable customer service representatives are available at any of the call centers 16, 18, processor 56 determines whether a delay period has been exceeded at step 130. As stated above, an ISDN-supported line provides a four second period before a call must be "rung." If the delay period has not been exceeded, method 100 returns to step 128 where processor 56 again determines whether any suitable customer service representatives and/or call centers 16, 18 are available. Processor 56 repeats steps 128 and 130 until it is determined that either a suitable customer service representative and call center 16, 18 are available or the delay period has been exceeded.

If it is determined at step 128 that a suitable customer service representative and call center 16,18 are available, method 100 moves to step 132 where processor 56 selects that call center for routing. On the other hand, if it is determined at step 130 that the delay period has been exceeded, processor 56 selects the most suitable and available call center 16, 18 at step 132.

Processor 56 and trunk interface card 50 cooperate to insert routing information into the call record of the customer call at step 134. The routing information may specify telephone numbers, extensions, or other routing information for the selected call center 16, 18. Other information, such as call-entered digits, can also be inserted into the call message to apprise the customer service representative of information regarding the customer's needs already collected by or stored at network routing unit 12. For example, data information, such as customer profile information 60 relating to the caller, can be inserted into the call record of the customer call.

Network routing unit 12 routes the customer call to the selected call center 16, 18 using the external switch hook transfer feature or other switchable transfer function supported by public switched telephone network 20 at step 136. This feature of external switch hook transfer releases or frees up the line of the link 27 being used for the customer call. Accordingly, this line is not tied up for the duration of the call as it is being completed at the selected call center 16, 18.

Although the invention and its advantages have been described in detail, it should be understood that various changes, substitutions, and alterations can be made therein without departing from the spirit and scope of the invention as defined by the appended claims.

What is claimed is:

1. A system for routing calls comprising:
   a plurality of call centers coupled to a public switched telephone network which supports a caller identification feature and a transfer feature;
   a trunk interface coupled via a link to the public switched telephone network, the trunk interface operable to receive a call from the public switched telephone network using a line of the link;
   a database operable to store customer profile information and call center information; and
   a processor coupled to the trunk interface and the database, the processor operable to identify a customer placing the call utilizing the caller identification feature, the processor further operable to retrieve from the database customer profile information associated with the identified customer, the processor further operable to select one of the call centers in response to the customer profile information and the call center information, the processor further operable to initiate routing of the call to the selected call center so that the line of the link between the trunk interface and the public switched telephone network is released utilizing the transfer feature.

2. The system of claim 1, further comprising a voice response unit coupled to the trunk interface, the voice response unit operable to query the customer to receive at least a portion of the customer profile information.

3. The system of claim 1, further comprising a network interface, the network interface operable to receive at least a portion of the call center information.

4. The system of claim 3, wherein the network interface is operable to receive call center dynamics information from at least one call center.

5. The system of claim 1, wherein the line comprises an ISDN-supported line having a predetermined delay period.

6. The system of claim 5, wherein the processor is operable to delay routing the call to the selected call center for the predetermined delay period.

7. The system of claim 1, wherein:
the database is further operable to store a customer service representative profile information; and
the processor is further operable to determine a suitable customer service representative to handle the call in response to the customer service representative profile information.

8. The system of claim 1, wherein the processor is further operable to insert routing information into a call record associated with the call, the routing information identifying the selected call center.

9. The system of claim 1, wherein the transfer feature comprises an external switch hook transfer feature supported by ISDN.

10. The system of claim 1, wherein the processor is further operable to rank the call centers in order of suitability.

11. A network routing unit for routing calls to one of a plurality of call centers coupled to a public switched telephone network which supports a caller identification feature and a transfer feature, the network routing unit comprising:
a trunk interface coupled via a link to the public switched telephone network, the trunk interface operable to receive a call from the public switched telephone network using a line of the link;
a database operable to store customer profile information and call center information; and
a processor coupled to the trunk interface and the database, the processor operable to identify a customer placing the call utilizing the caller identification feature, the processor further operable to retrieve from the database customer profile information associated with the identified caller, the processor further operable to select one of the call centers in response to the customer profile information and the call center information, the processor further operable to initiate routing of the call to the selected call center so that the line of the link between the trunk interface and the public switched telephone network is released utilizing the transfer feature.

12. The network routing unit of claim 11, further comprising a voice response unit coupled to the trunk interface and the processor, the voice response unit operable to query the customer placing the call.

13. The network routing unit of claim 11, further comprising a network interface coupled to the processor, the network interface operable to receive at least a portion of the call center information.

14. The network routing unit of claim 11, wherein the line comprises an ISDN-supported line having a predetermined delay period.

15. The network routing unit of claim 14, wherein the processor is operable to delay routing the call to the selected call center for the predetermined delay period.

16. The network routing unit of claim 11, wherein the processor is further operable to insert routing information into a call record associated with the call, the routing information identifying the selected call center.

17. The network routing unit of claim 11, wherein the transfer feature comprises an external switch hook transfer feature supported by ISDN.

18. The network routing unit of claim 11, wherein the processor is further operable to rank the call centers in order of suitability.

19. A method for routing calls to one of a plurality of call centers, the method comprising:
storing call center information in a database;
receiving a call from a public switched telephone network using a line of a link, the public switched telephone network supporting a caller identification feature and a transfer feature;
identifying a customer placing the call utilizing the caller identification feature;
retrieving customer profile information associated with the identified customer;
selecting one of the call centers in response to the customer profile information and the call center information; and
routing the call to the selected call center, wherein the line of the link to the public switched telephone network is released utilizing the transfer feature.

20. The method of claim 19, wherein the step of retrieving customer profile information comprises querying the customer with a voice response unit to receive at least a portion of the customer profile information.

21. The method of claim 19, further comprising the step of storing customer profile information in the database, and wherein the step of retrieving customer profile information comprises querying the database.

22. The method of claim 19, further comprising the step of transmitting customer profile information to the selected call center.

23. The method of claim 19, wherein the line comprises an ISDN-supported line having a predetermined delay period, and further comprising the step of delaying the routing of the call to the selected call center for the predetermined delay period.

24. The method of claim 19, further comprising the step of inserting routing information into a call record associated with the call, the routing information identifying the selected call center.

25. The method of claim 19, wherein the transfer feature comprises an external switch hook transfer feature supported by ISDN.

26. The method of claim 19, further comprising the step of ranking the call centers in order of suitability.

27. The method of claim 19, further comprising the step of selecting a suitable customer service representative for handling the call.

* * * * *